US012669475B2

(12) United States Patent
    Svensson

(10) Patent No.:    US 12,669,475 B2
(45) Date of Patent:         Jun. 30, 2026

(54) QCM APPARATUS

(71) Applicant: Biolin Scientific AB, Västra Frölunda (SE)

(72) Inventor: Peter Svensson, Västra Frölunda (SE)

(73) Assignee: Biolin Scientific AB, Västra Frölunda (SE)

( * ) Notice: Subject to any disclaimer, the term of this patent is extended or adjusted under 35 U.S.C. 154(b) by 360 days.

(21) Appl. No.: 18/683,733

(22) PCT Filed: Aug. 30, 2022

(86) PCT No.: PCT/EP2022/074107
     § 371 (c)(1),
     (2) Date: Feb. 14, 2024

(87) PCT Pub. No.: WO2023/031213
     PCT Pub. Date: Mar. 9, 2023

(65) Prior Publication Data
     US 2024/0353372 A1      Oct. 24, 2024

(30) Foreign Application Priority Data

Aug. 31, 2021    (EP) .................................... 21193921

(51) Int. Cl.
     *G01N 29/02*      (2006.01)
     *G01N 29/24*      (2006.01)
(52) U.S. Cl.
     CPC ....... *G01N 29/022* (2013.01); *G01N 29/2443* (2013.01); *G01N 2291/014* (2013.01)
(58) Field of Classification Search
     CPC .................................................... G01N 29/022
     USPC ........................................................ 73/61.49
     See application file for complete search history.

(56) References Cited

U.S. PATENT DOCUMENTS

2009/0173158 A1*   7/2009   Gehring ............... G01N 29/022
                                                               73/590

OTHER PUBLICATIONS

International Search Report and Written Opinion for PCT/EP2022/0747107 which is a parent application to the instant application, dated Nov. 15, 2022; 9 pages.
European Search Report and written opinion for EP21193921.0 which is a parent application to the instant application; dated Jan. 5, 2022; 5 pages.

* cited by examiner

*Primary Examiner* — Walter L Lindsay, Jr.
*Assistant Examiner* — Philip T Fadul
(74) *Attorney, Agent, or Firm* — Harness, Dickey & Pierce, P.L.C.; Anthony G. Fussner

(57)                    ABSTRACT

A quartz crystal microbalance, QCM, sensor apparatus comprising a fluid selector unit for selectively placing a sample fluid container in fluid connection with a measurement cell formed above a QCM sensor, said fluid selector unit having a plurality of inlet ports, a sensor outlet configured to be in fluid connection with said sensor, and a valve arrangement for selectively connecting one of said inlets to said outlet. The fluid selector unit is sandwiched between the fluid sample containers and the sample holder, and the sample fluid containers, fluid selector unit and sensor holder are arranged in a compartment of a thermally insulating housing, an interior of the compartment having a substantially homogeneous temperature. The invention facilitates temperature control, such as maintaining a stable temperature and ensuring a desired temperature change.

13 Claims, 5 Drawing Sheets

QCM APPARATUS

This patent application is a U.S. national stage filing under 35 U.S.C. § 371 of PCT International Application No. PCT/EP2022/074107 filed Aug. 30, 2022 (published as WO2023/031213 on Mar. 9, 2023), which claims priority to and the benefit of European Application No. 21193921.0 filed Aug. 31, 2021. The entire contents of these applications are incorporated herein by reference.

FIELD OF THE INVENTION

The present invention relates to a quartz crystal microbalance (QCM) sensor apparatus with improved temperature control.

BACKGROUND OF THE INVENTION

Quartz crystal microbalance (QCM) sensing has gained increasing popularity as an efficient sensing technique for detecting molecular adsorption (or desorption) on a substrate. In QCM sensing a liquid containing a substance is allowed to flow past a sensor element including a crystal disc sandwiched between a pair of electrodes. An AC voltage is connected to the electrodes, causing the disc to oscillate at its acoustic resonance frequency, and the system is allowed to reach a steady state. As molecular adsorption creates a film on the sensor surface, the resonance frequency changes. A frequency detection device is connected to detect this change, thereby allowing determination of the mass of the adsorption layer.

One particularly useful sensing approach is QCM with dissipation monitoring, referred to as QCM-D. In QCM-D sensing, the induced oscillation is allowed to decay ("ring off") and an energy dissipation factor is determined. Changes in this dissipation factor are related to the viscoelasticity (softness) of the adsorption layer.

When performing QCM (or QCM-D) sensing, it is often required to test multiple sample fluids. The changing of fluids needs to be done carefully, and in a consistent manner. In order to automate this process, the present applicant have developed a product called Q-Sense Pro. This apparatus includes a mechanical system which can draw sample fluid from a set of sample holders according to a pre-programmed schedule. While Q-Sense Pro has been a considerable success on the market, there is a need for an even more improved apparatus.

Specifically, it has been realized that even a rather small temperature change may cause signals in the same order of magnitude as signals caused by the molecular adsorption. Also, an increase temperature of the sensing fluid may cause gas formation, which has an even larger impact on the QCM measurement result.

Based on this, it would be desirable to provide a QCM sensor apparatus with an improved temperature management.

GENERAL DISCLOSURE OF THE INVENTION

This and other objects are achieved with a QCM sensor apparatus comprising a sensor holder having a compartment for receiving a QCM sensor, a plurality of sample fluid containers, a fluid selector unit for selectively placing one of the sample fluid containers in fluid connection with the compartment. The fluid selector unit has a plurality of inlet ports, each inlet port in fluid connection with a sample fluid container, a sensor outlet configured to be in fluid connection with the sensor, a valve arrangement for selectively connecting one of the inlets to the outlet, and a thermoelectrical element arranged in thermal connection with the sensor holder.

The fluid selector unit is sandwiched between the fluid sample containers and the sensor holder, and the sample fluid containers, fluid selector unit and sensor holder are arranged in a compartment of a thermally insulating housing, an interior of the compartment having a substantially homogeneous temperature.

According to the invention, the components of the sensor apparatus are integrated into a comparably small space, and contained in a temperature isolating housing. This facilitates temperature control, such as maintaining a stable temperature and ensuring a desired temperature change. The invention is primarily intended for QCM sensing, but is not necessarily limited thereto.

The fluid selector unit serves as a valve, to selectively connect one of the sample fluid containers to the measuring cell, and to provide a desired flow of sample fluid past the sensor. The fluid selector unit also serves to integrate the fluid sample containers with the sensor holder in a relatively confined space. The fluid selector unit includes a small scale fluidics system, with channels and valves, to enable such integration. Examples of such small sale fluidics systems are sometimes referred to as a "lab-on-chip".

In one embodiment, the sample fluid containers, the fluid selector unit and the sensor holder are arranged in a vertical stack arrangement, with the sample fluid containers on top. In such a vertical stack, force of gravity may promote fluid flow through the apparatus.

The sample fluid containers are preferably arranged with their bottom ends in fluid connection with input ports on an upper side of the fluid selector, such that the input ports are exposed to a fluid pressure.

For example, the valve arrangement may include a set of conduits integrally formed within the fluid selector unit, each conduit connecting one of the inlet ports with the sensor outlet, and a valve configured such that each conduit as an open state, in which fluid is allowed to flow through the conduit, and a closed state, in which fluid is prevented from flowing through the conduit.

In one embodiment, the valve is a disc valve including a rotating disc which is rotationally arranged around an axis of rotation with respect to a main body. The main body has a first surface facing the rotating disc and a second, opposite surface, a central through channel having an inlet on the first surface, the inlet being aligned with the axis of rotation, and an outlet on the second surface, the outlet being in fluid connection with the sensor outlet, and a set of peripheral through channels, each peripheral though channel having an inlet on the second surface, the inlet being in fluid connection with one of the sample fluid containers, and an outlet on the first surface, each respective outlet being located at a common distance from the inlet of the central through channel. The rotating disc has a radial connection channel, extending from the axis of rotation to a peripheral position aligned with the openings of the peripheral channels, the connection channel thereby selectively connecting one of the peripheral through channel outlets with the central through channel inlet upon rotation of the rotating disc, in order to selectively connect one of the sample fluid containers with the sensor outlet.

This type of rotating disc valve is particularly advantageous for allowing integration of the fluid selector unit with the sensor holder and fluid sample containers. This integration, in turn, enables maintaining the desired homogenous temperature.

In a specific embodiment, the main body of the rotating disc valve further comprises an off-center through channel, located in an angular sector of the disc where there are no peripheral through channels, and located at a radial distance between the central through channel and the peripheral channels. The rotating disc further has a second, sickle-shaped, connection channel having a first essentially radial section connected to a second, curved section extending along a path at the radial distance from the axis of rotation. The sickle-shaped channel is configured to selectively connect the off-center through channel with one of the peripheral channels.

Such a rotating disc will thus have two outlets, individually connectable to each of the inlets. Accordingly, each fluid sample container can be connected either to a first outlet, connected to the sensor cell, or to a second outlet, which may be used e.g. as a purge outlet of for cleaning.

Such a rotating disc has advantages also beyond the implementation in a QCM apparatus as claimed herein. Indeed, the rotating disc with two outlets is considered to represent a separate inventive concept. Not only in other QCM sensing applications, but also in general fluidic systems.

It is noted that in principle, the rotating disc may be provided with more than two outlets. For example, if the inlets are arranged in an angular sector corresponding to only one third of the disc, then the valve may have three outlets with appropriate design.

BRIEF DESCRIPTION OF THE DRAWINGS

The present invention will be described in more detail with reference to the appended drawings, showing currently preferred embodiments of the invention.

DETAILED DESCRIPTION OF PREFERRED EMBODIMENTS

Figure 1:
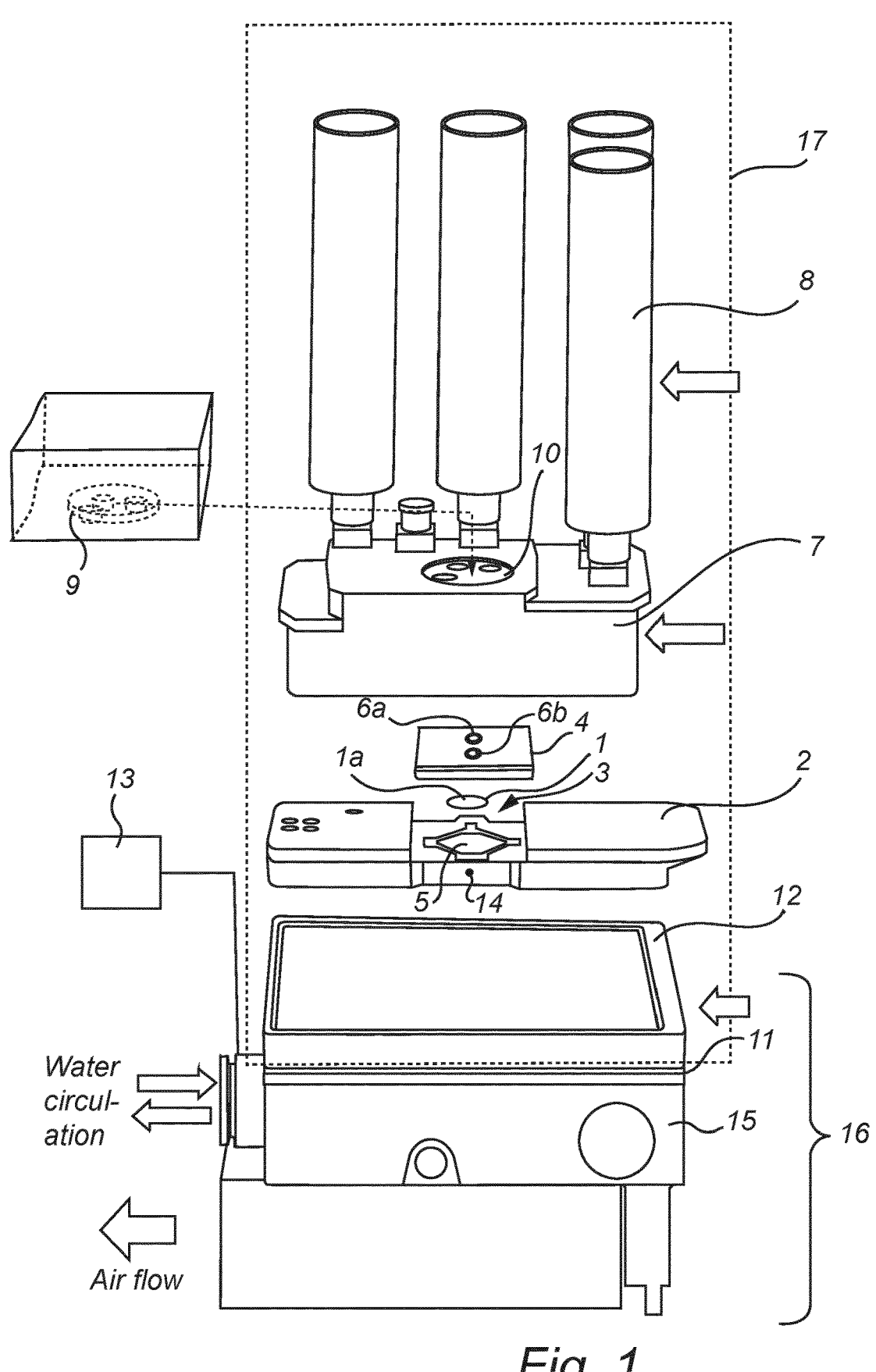
FIG. 1 is an exploded view of parts of a QCM sensor apparatus according to an embodiment of the invention.

The QCM sensor apparatus in FIG. 1 includes a QCM sensor 1 arranged in a sensor holder 2. The QCM sensor is a made of crystal and typically has the shape of a disc. The holder has a compartment 3 configured to receive the sensor 1. The compartment is sealed by a lid 4. When a sensor 1 is placed in the compartment 3, and the compartment is closed by the lid 4, the space above the sensor 1 forms a measuring cell 5, allowing a fluid to flow across a surface 1a of the sensor 1. The lid 4 is provided with two openings 6a, 6b, providing access to the measuring cell 5.

The apparatus further includes a plurality of sample fluid containers 8, here in the form of four vertical tubes, arranged on a fluid selector unit 7. The fluid selector unit 7 comprises a valve arrangement 10, configured to selectively connect one of the sample fluid containers 8 to the measuring cell 5. An actuator 9, e.g. an electrical step motor, is arranged in mechanical connection with the valve arrangement 10, so as to be capable of operating the valve arrangement 10 to connect one of the sample fluid containers 8 with the measurement cell 5. In the illustrated example, the actuator 9 has a set of pins (reference 45 in FIG. 4) configured to engage corresponding recesses 10 (46 in FIG. 4) in the valve arrangement 10.

On the opposite side of the sample holder 2 with respect to the fluid selector unit 7 (i.e. below the sample holder 2 in FIG. 1), is arranged a thermoelectric element 11, e.g. a Peltier element. Sandwiched between the sample holder 2 and the thermoelectric element 11 is a heat transfer block 12. The thermoelectric element 11 is connected to a controller 13, also connected to one or several sensors 14. In the illustrated example, a sensor 14 is arranged in the body of the sensor holder 2, under the sensor 1. Optionally, a heat source/sink 15 (heating or cooling) is arranged on the other side of the thermoelectric element 11. The controller 13 is configured to control the thermoelectric element 11 (and optionally the heat source/sink 15) based on feedback from the sensor(s) 14.

In some embodiments, additional heat sources may be provided on the other side of the sensor holder, e.g. in or adjacent to the fluid selector 7.

The heat transfer block 12, thermoelectric element 11, controller 13, sensor(s) 14 and optional heat source/sink 15 together form a temperature control arrangement 16.

It is noted that the QCM apparatus in FIG. 1 requires additional components in order to be operational, such as signal generator, a frequency detection apparatus, and connecting of a cooling/heating medium to the heat source/sink. Such components are not disclosed in detail here, as they are not considered relevant for the disclosure of the present invention.

According to the present invention, the sample fluid containers 8, fluid selector unit 7, and sample holder 2 are enclosed by a thermally isolating enclosure (see FIG. 2), thereby defining a temperature zone 17 inside which the temperature is substantially homogeneous. As indicated in FIG. 1, also the heat transfer block 12 may be considered to be included in the temperature zone 17. The temperature inside the zone 17 is controlled to a desired temperature by temperature control arrangement 16.

Figure 2:
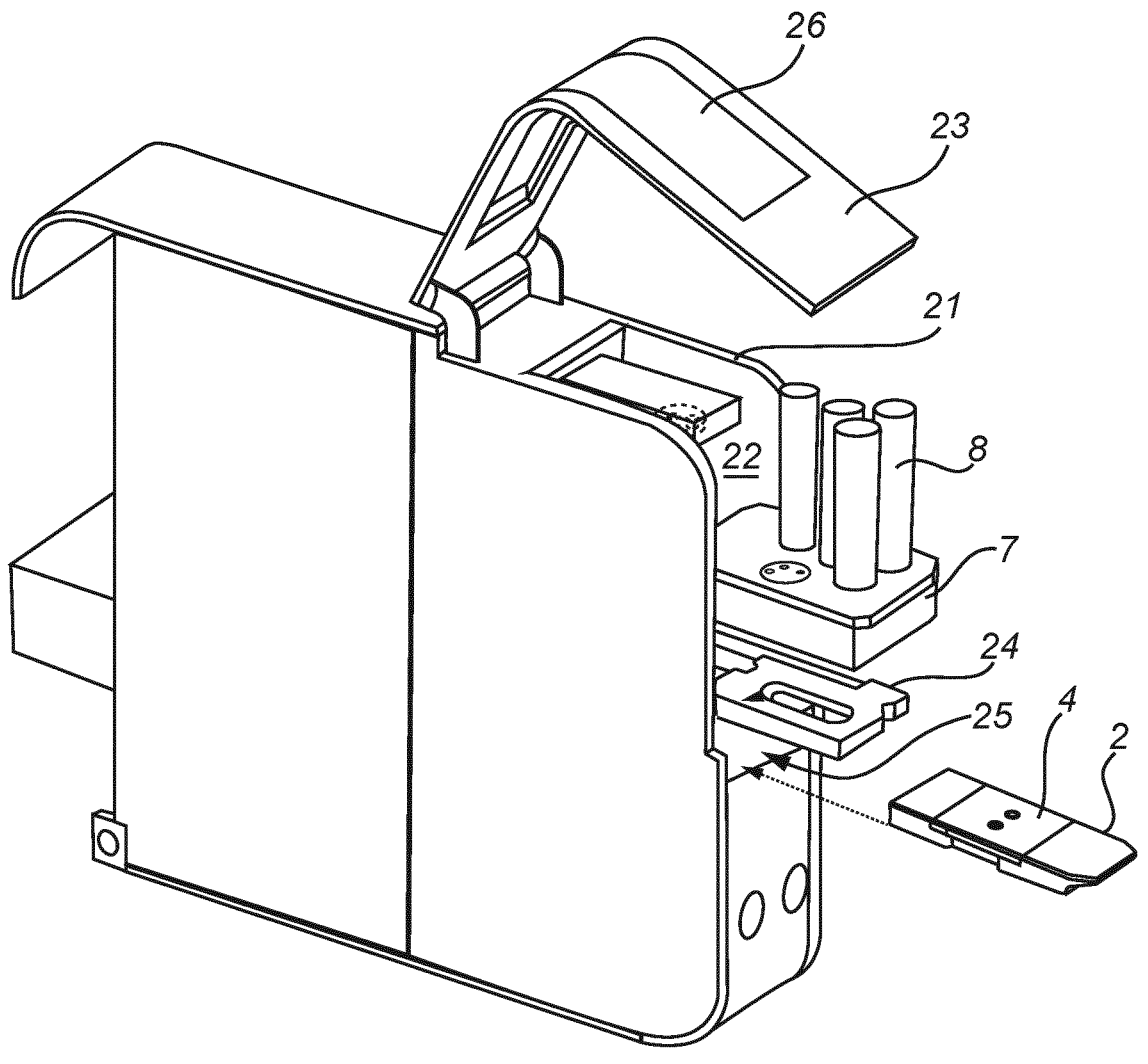
FIG. 2 is a perspective view of the apparatus in FIG. 1.

With reference to FIG. 2, the parts illustrated in FIG. 1 are arranged in a compartment 22 of an enclosure 21. It is this compartment 22 that forms the temperature zone 17. At least the part of enclosure 21 that surrounds the compartment 22 is designed to be thermally isolating, i.e. have a comparably large thermal resistance. As an example, the enclosure may be made of a plastic material. It may further comprise foam or other porous materials, serving as heat isolators. The enclosure may also comprise multiple rigid layers with air in between, similar to a thermos.

The enclosure 21 further has a lid 23 which is openable to allow access to the compartment 22. With the lid 23 in its open position, a sliding tray 24 may be pulled out, and the fluid selector unit 7 with its sample fluid containers 8 may be placed on the sliding tray 24 before it is pushed back into the compartment 22. The sensor holder 2 is insertable in a location 25 under the fluid selector unit. The sensor holder 2 is thus releasably arranged in the apparatus, independently of the fluid selector unit 7, and may be withdrawn in order to allow replacement of the sensor 1.

The lid may be provided with a transparent window 26, allowing a user to observe the fluid sample containers 8. In order to be heat isolating, the window may comprise double layers of suitable material, e.g. glass or transparent plastic.

To improve visibility, the compartment 22 may further be provided with appropriate illumination (not shown).

Figure 3:
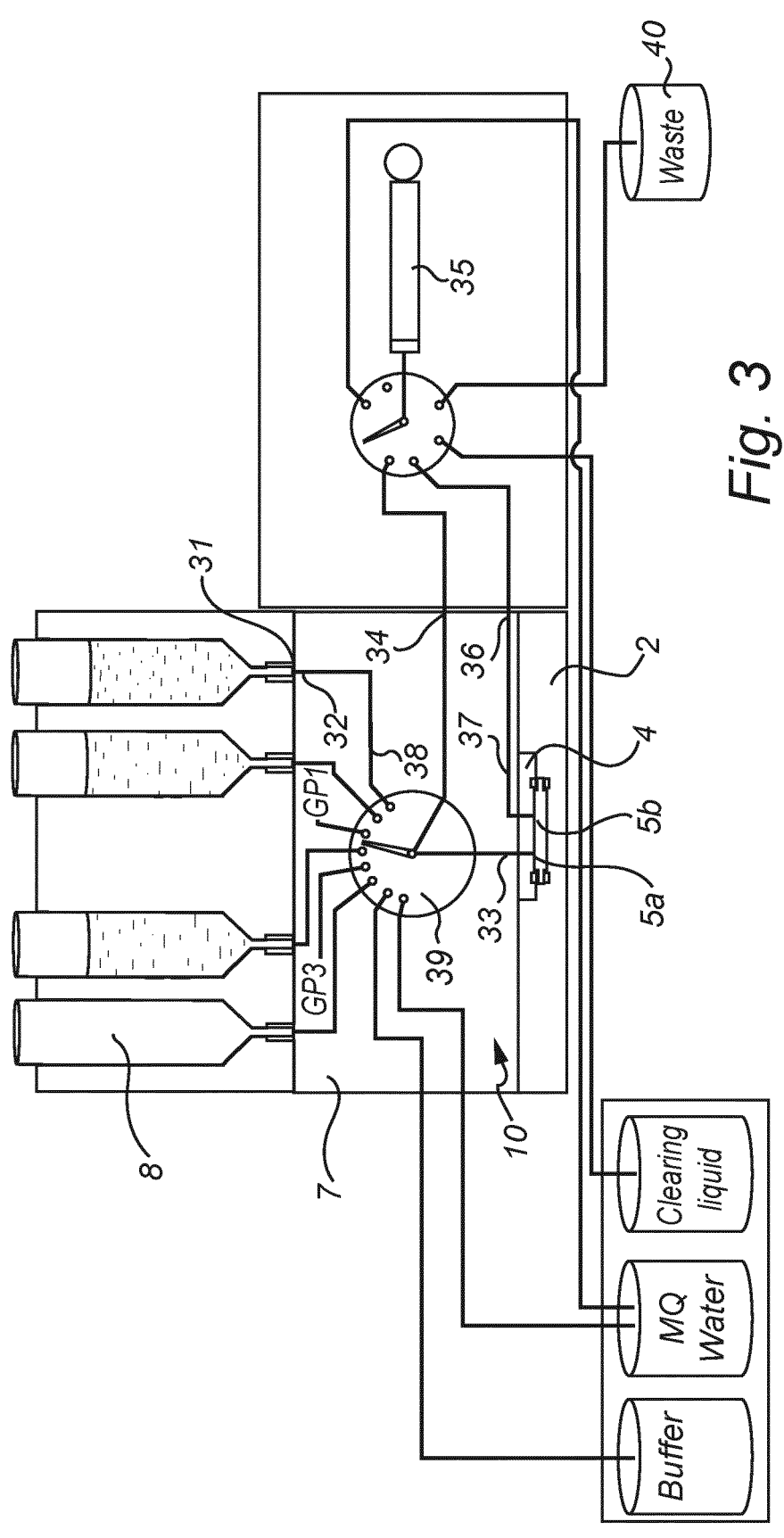
FIG. 3 is a schematic view of the fluid control in the apparatus in FIG. 1.

Turning to FIG. 3, the fluid control of the QCM sensor apparatus in FIGS. 1-2 is shown in more detail.

In the illustrated example, each sample fluid container 8 is provided with a bottom opening 31, connected to a corresponding inlet port 32 on the upper surface of the fluid selector unit 7. With this design, each inlet port 32 will be exposed to a fluid pressure from the pillar of sample fluid in the container 8.

The fluid selector unit 7 further has a first outlet 33, referred to as a sensor outlet, connected to opening 6a of the lid 4 of the sensor holder 2, thereby providing access to one end 5a of the measurement cell 5. In the illustrated example, the fluid selector unit 7 also has a second outlet referred to as a drain outlet 34.

A pump 35 is selectively connected to the other end 5b of the measurement cell 5 or the drain outlet 34. The pump 35 may be connected directly to opening 6b of the lid of the sample holder 2 to have access to the measurement cell 5. However, in the illustrated embodiment, the pump is connected to a port 36 of the fluid selection unit 7, and this port 36 is connected to the other end 5b of the measurement cell 5 via a conduit 37 formed in the fluid selector unit 7. With this design, the sensor holder 2 only requires a two-terminal interface with the fluid selector unit 7. This two-terminal interface is provided by the openings 6a, 6b.

As mentioned above, a valve arrangement 10 is configured to selectively connect one of the inlet ports 32 with the sensor outlet 33, and also to the drain outlet 34 when available. The valve arrangement 10 generally includes a set of conduits 38 formed within a solid body of the selector unit 7, each conduit connecting one of the inlet ports 32 with the outlet(s) 33, 34. The valve arrangement is configured so that each conduit 38 has an open state, in which fluid is allowed to flow through the conduit, and a closed state, in which fluid is prevented from flowing through the conduit. In the illustrated example, the valve arrangement includes is a rotating disc valve 39, described in more detail with reference to FIG. 4.

When the pump 35 is connected to the measurement cell 5, a flow of fluid is created from a sample fluid container 8 connected to the sensor outlet 33 past the sensor 1, to a waste container 40. When the pump 35 is connected to the drain outlet 34, a flow is created directly from the connected sample fluid container to the waste container 40.

Figure 4:
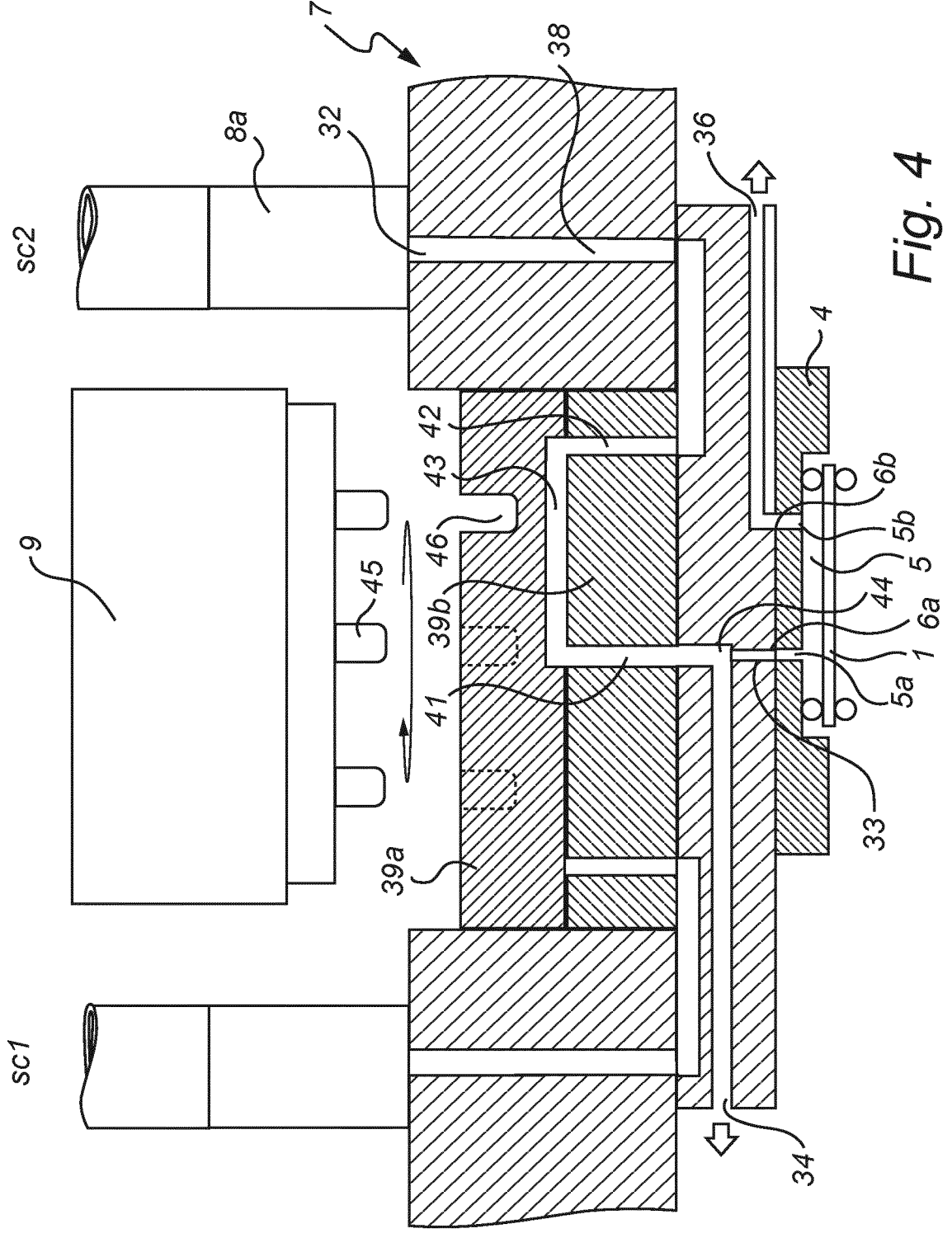
FIG. 4 shows in more detail an example of a valve arrangement in the apparatus in FIG. 1.

The details of the rotating disc valve 39 are shown more clearly in FIG. 4.

In the illustrated case, the disc valve 39 comprises a first, rotating disc 39a rotationally arranged on a second, stationary disc 39b. The stationary disc 39b has a central through channel 41, aligned with the axis of rotation, and a set of peripheral through channels 42 each arranged at a common radial distance from the central though channel. This means that the openings of the peripheral through channels 42 are located along a circle surrounding the central channel 41. The rotating disc 39a is formed with a radial connection channel 43, extending from the center to a peripheral position aligned with the channels 42. By rotating the rotating disc 39a, the central through channel 41 is connected to one of the peripheral through channels 42 by the radial channel 43.

In principle, the rotating disc 39a could rest directly on the surface of the fluid selector unit 7. However, the interface between rotating disc 39a and its support needs to be liquid tight, and thus requires high tolerance machining and surface processing. Therefore, it is easier to manufacture the valve with two discs rotationally connected with a liquid tight interface, and then sealingly fix (e.g. glue or solder) one of the discs to the supporting structure, i.e. in this case the fluid selector unit 7.

Each of the sample fluid containers 8 is connected to one of the peripheral through channels 42 by a conduit 38, while the central through channel 41 is connected to a mixing point 44, in fluid connection with sensor outlet 33 and drain outlet 34.

In use, the actuator 9 is mechanically connected to the rotating disc 39a, e.g. by protrusions 45 engaging recesses 46 in the rotating disc 39a. The actuator 9 rotates the rotating disc 39a to a desired position, in which one of the containers 8a is placed in fluid connection with the mixing point 44. Then, pump 35 is connected to drain outlet 34, and activated to promote a flow of liquid from the container 8a to the waste container 40. When it can be safely concluded that the sample fluid from container 8a has reached the mixing point 44, the pump 35 is instead connected to the outlet 36, connected to the measuring cell 5. This promotes a flow of liquid from container 8a past the sensor 1, thereby enabling measurement.

Figure 5A:
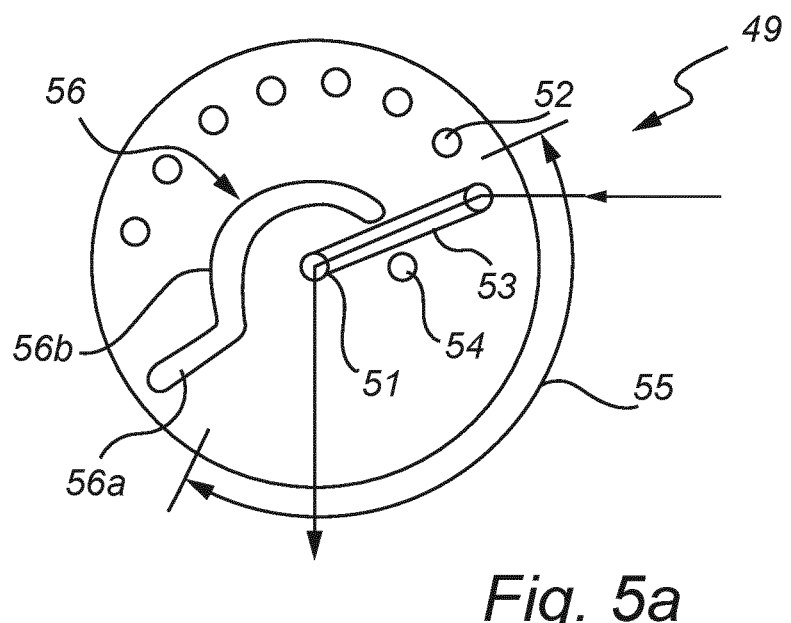
FIG. 5a-b show another example of a valve arrangement, having two outlets.
Figure 5B:
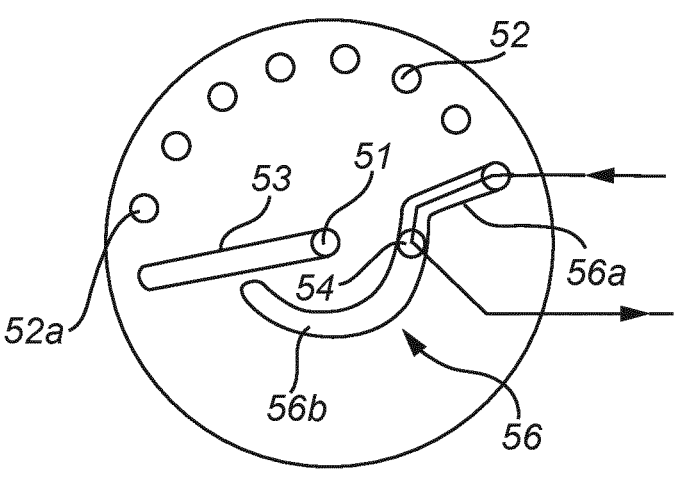

FIGS. 5a and 5b illustrate very schematically an alternative disc valve 49, having not one but two separate outputs.

Similar to the valve 39 in FIG. 4, the valve 49 in FIG. 5a-b has two parts rotationally connected to each other. Also in this case the first, stationary, part has a central through channel 51 and a set of peripheral through channels 52. However, it also has an additional, off-center through channel 54, located in an angular sector 55 of the disc where there are no peripheral channels 52, and located radially between the central channel 51 and the peripheral channels 52.

The second, rotating, part is again formed with a radial channel 53. However, it is also formed with a second, transversal channel 56, having a first essentially radial section 56a connected to a second, curved section 56b with essentially constant radius. The transversal channel 56 thus has the general shape of a sickle.

In use, the disc valve 49 has two operating modes. In a first mode (shown in FIG. 5a) the central channel 51 is connected to one of the peripheral channels 52 by the radial channel 53. This corresponds to the operation of disc valve 39 in FIG. 4.

When the rotating disc is rotated past the last peripheral channel 52a, it enters the second operating mode (see FIG. 5b). Here, the radial channel 53 is no longer connected to any one of the peripheral channels 52, and the central channel 51 is thus effectively closed. Instead, the sickle-shaped channel 56 now connects the off-center through channel 54 with one of the peripheral channels 52. A the rotating disc is rotated further, the peripheral end of channel 56 moves from one peripheral channel to the next, while the off-center through channel remains connected to the curved section 56b of the channel 56.

With a disc valve 49 as shown in FIG. 5a-5b, the QCM sensor apparatus is provided with an additional outlet, which may be used as a purge outlet or for cleaning.

The person skilled in the art realizes that the present invention by no means is limited to the preferred embodiments described above. On the contrary, many modifications and variations are possible within the scope of the appended claims. For example, the shape and form of the apparatus may be different from the illustrated example. The relative arrangement of the various components may also be different, and for example are not necessarily arranged in a vertical stack.

7

The invention claimed is:

1. A quartz crystal microbalance, QCM, sensor apparatus comprising:

a sensor holder having a compartment for receiving a QCM sensor, a plurality of sample fluid containers, a fluid selector unit for selectively placing one of said sample fluid containers in fluid connection with said compartment, said fluid selector unit having:

a plurality of inlet ports, each inlet port in fluid connection with a sample fluid container, a sensor outlet configured to be in fluid connection with said sensor, and a valve arrangement for selectively connecting one of said inlets to said outlet, and a thermoelectrical element arranged in thermal connection with the sensor holder, wherein said fluid selector unit is sandwiched between the fluid sample containers and the sensor holder, and wherein the sensor apparatus further comprises a thermally insulating housing enclosing the sample fluid containers, fluid selector unit and sensor holder, an interior of the compartment having a substantially homogeneous temperature.

2. The sensor apparatus according to claim 1, wherein the sample fluid containers, fluid selector unit and sensor holder are arranged in a vertical stack arrangement.

3. The sensor apparatus according to claim 1, wherein the sensor holder is removably mounted in the compartment, and wherein the housing has an openable lid to allow removal/insertion of the sensor holder.

4. The sensor apparatus according to claim 1, wherein the thermoelectrical element is a Peltier element.

5. The sensor apparatus according to claim 1, wherein the thermoelectrical element is arranged on an opposite side of the sensor holder with respect to the sample fluid containers.

6. The sensor apparatus according to claim 1, further comprising at least one temperature sensor, and a controller connected to said sensor(s) and said thermoelectric element.

7. The sensor apparatus according to claim 1, wherein each fluid sample container has an opening in a bottom end, which opening is mechanically mounted to, and in direct fluid connection with, one of said inlet ports.

8. The sensor apparatus according to claim 1, wherein said valve arrangement includes:

a set of conduits integrally formed within said fluid selector unit, each conduit connecting one of said inlet ports with the sensor outlet, and a valve configured such that each conduit has an open state, in which fluid is allowed to flow through the conduit, and a closed state, in which fluid is prevented from flowing through the conduit.

9. The sensor apparatus according to claim 8, wherein said valve is a disc valve including a main body and a rotating disc which is rotationally arranged around an axis of rotation with respect to the main body, the main body having:

a first surface facing the rotating disc and a second, opposite surface, a central through channel having an inlet on the first surface, said inlet being aligned with the axis of rotation, and an outlet on the second surface, said outlet being in fluid connection with the sensor outlet, and a set of peripheral through channels, each peripheral though channel having an inlet on the second surface, said inlet being in fluid connection with one of said sample fluid containers, and an outlet on the first surface, each respective outlet being located at a common distance from the inlet of the central through channel, the rotating disc having a radial connection channel, extending from the axis of rotation to a peripheral position aligned with the openings of the peripheral channels, the connection channel thereby selectively connecting one of said peripheral through channel outlets with the central through channel inlet upon rotation of the rotating disc, in order to selectively connect one of the sample fluid containers with the sensor outlet.

10. The sensor apparatus according to claim 9, wherein the main body further comprises an off-center through channel, located in an angular sector of the disc where there are no peripheral through channels, and located at a radial distance between the central through channel and the peripheral channels, and wherein the rotating disc further has a second, sickle-shaped, connection channel having a first essentially radial section connected to a second, curved section extending along a path at said radial distance from the axis of rotation, said sickle-shaped channel is configured to selectively connect the off-center through channel with one of the peripheral channels.

11. The sensor apparatus according to claim 1, further comprising two fluid connections between the compartment and the fluid selector unit, said two fluid connections including a first fluid connection on a first end of the compartment, and a second fluid connection on a second end of the compartment.

12. The sensor apparatus according to claim 1, wherein the fluid selector unit has a drain outlet, a mixing point being in fluid connection with said sensor outlet and said drain outlet.

13. The sensor apparatus according to claim 12, further comprising a pump selectively connected to one of the sensor outlet and the drain outlet.

* * * * *